H. AVERY.
Transplanter.

No. 208,703. Patented Oct. 8, 1878.

Attest:
Courtney A. Cooper
Edwin A. Welsh

Inventor
Henry Avery
By his attorney
Charles E. Foster

UNITED STATES PATENT OFFICE.

HENRY AVERY, OF BURLINGTON, IOWA.

IMPROVEMENT IN TRANSPLANTERS.

Specification forming part of Letters Patent No. 208,703, dated October 8, 1878; application filed August 19, 1878.

*To all whom it may concern:*

Be it known that I, HENRY AVERY, of Burlington, Des Moines county, Iowa, have invented Improvements in Transplanters, of which the following is a specification:

My invention is a transplanter constructed as fully described hereinafter, so as to facilitate its introduction into the ground, permit the use of handles less in size and weight than those usually required, and to secure the plant with less disturbance of the earth about the roots than results from the use of ordinary transplanters.

Figure 1:
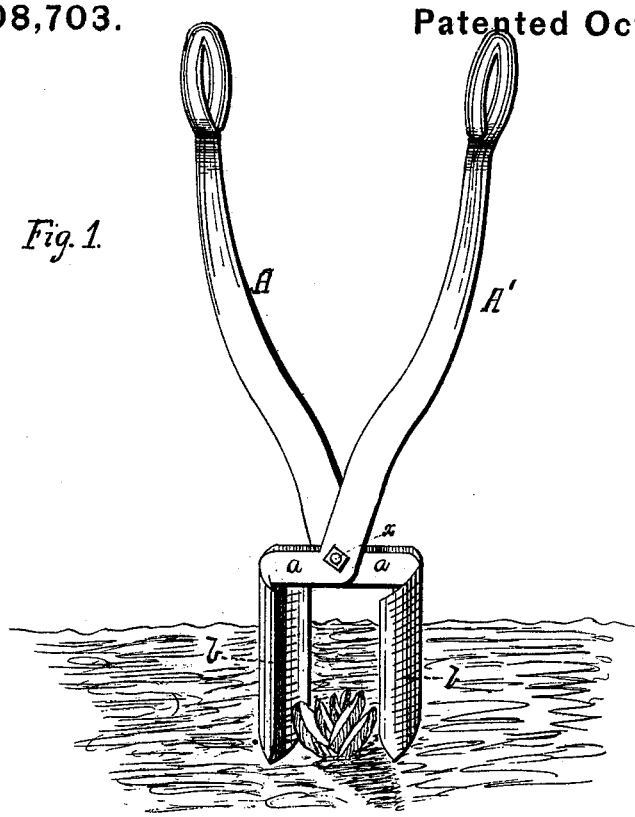
Figure 2:
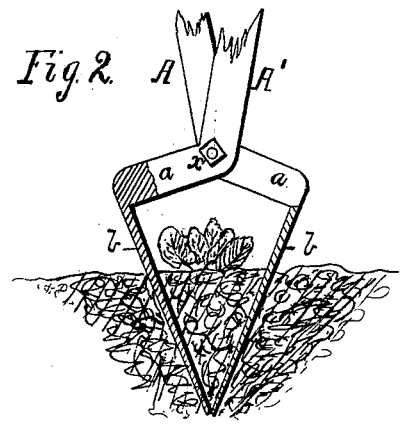

In the drawing forming part of this specification, Figure 1 is a perspective view of my improved transplanter; Fig. 2, a section, showing the operation of the implement.

Transplanters as ordinarily constructed require the use of stiff, strong, and heavy handles, whereby they may be thrust into the earth, and this operation, especially if the ground is hard, can only be effected by the exercise of considerable strength, while the act of inserting or withdrawing the instrument results in such a disturbance of the earth around the roots of the plant that the same is injured.

The object of my invention is to make the implement so as to obviate these difficulties.

A A' represent the legs or handles of the implement, which may be constructed in any suitable manner. As shown in the drawing, each leg is of one piece of metal, bent near the lower end at $x$, so as to form an arm or shoulder, $a$, the two being pivoted by a pin at $x$. To the end of each leg is secured a spade or scoop, $b$, consisting of a thin metal blade, rounded at the lower end and curved transversely, as shown, so that the two, when separated, will form parts of a hollow cylinder. The spades are arranged each at a right angle to the shoulder $a$, and the legs are constructed so that when folded together the blades $b$ $b$ will be at an angle to each other, closing toward the lower ends, as shown in Fig. 2.

When a plant is to be removed the legs are opened until the blades are parallel, when they are placed with their sharp lower edges on the ground on opposite sides of the plant. The operator bearing on the shoulder or shoulders $a$ with one or both feet, directly above the upper edges of the blades, forces the latter into the ground. As the blades are curved and the weight is brought upon them while parallel to each other and directly in a vertical direction, there is little strain upon the blades tending to break them from the arms $a$, and they will penetrate the earth with but little resistance and without in the least disturbing the earth around the plant, or displacing adjacent plants.

After the blades are inserted the legs are brought together, when the blades, without disturbing the crust, owing to their broad lower edges, will press the lower portion of earth close to the roots and solidify the whole body of earth between them, so as to protect the roots and prevent the earth falling therefrom, while the whole body is so reduced that no obstacle exists as to the lifting of the same without friction from the opening.

When the plant is to be placed in its new position the converging blades present a wedge form adapted to readily penetrate the earth.

I am aware that transplanters have been provided with foot rests or bearings, and I do not claim the same, broadly; but

I claim—

As a new article of manufacture, a transplanter consisting of handles A A', pivoted at $x$, and blades $b$, of uniform width, curved transversely and connected at right angles below arms or shoulders $a$, extending to or forming part of the handles, and arranged as described, that the blades may be parallel when separated, and the shoulders are horizontal, as and for the purpose set forth.

In testimony whereof I have signed my name to this specification in the presence of two subscribing witnesses.

HENRY AVERY.

Witnesses:
JOHN C. POWER,
PAUL GRULICH.